(12) United States Patent
Hasegawa et al.

(10) Patent No.: US 8,133,085 B2
(45) Date of Patent: Mar. 13, 2012

(54) COWLING STRUCTURE FOR OUTBOARD MOTOR

(75) Inventors: Hiroyuki Hasegawa, Shizuoka (JP); Kohei Nomura, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 264 days.

(21) Appl. No.: 12/485,094

(22) Filed: Jun. 16, 2009

(65) Prior Publication Data
US 2009/0318038 A1    Dec. 24, 2009

(30) Foreign Application Priority Data

Jun. 24, 2008  (JP) .................................. 2008-164989

(51) Int. Cl.
*B63H 20/32* (2006.01)
*B63H 21/36* (2006.01)

(52) U.S. Cl. ......................................................... 440/77
(58) Field of Classification Search ............... 440/76–78
See application file for complete search history.

(56) References Cited

FOREIGN PATENT DOCUMENTS
JP        06-211191 A     8/1994

*Primary Examiner* — Daniel Venne
(74) *Attorney, Agent, or Firm* — Keating & Bennett, LLP

(57) ABSTRACT

In cowling structure for an outboard motor, a through hole is formed below an upper-cowling joining surface of a lower cowling; control cables are supported with a cable supporting groove of a back side plate, and the back side plate is fixed to the through hole; a sealing member that is covered on the outside of the control cables, is fitted into the through hole; a groove of a front side plate is placed around the control cables, and the front side plate is set onto the sealing member; and the sealing member is fixed to the lower cowling by a bolt together with the front side plate. The cowling structure for an outboard motor can prevent water intrusion by removing a notch on an upper-cowling joining surface of a lower cowling.

8 Claims, 13 Drawing Sheets

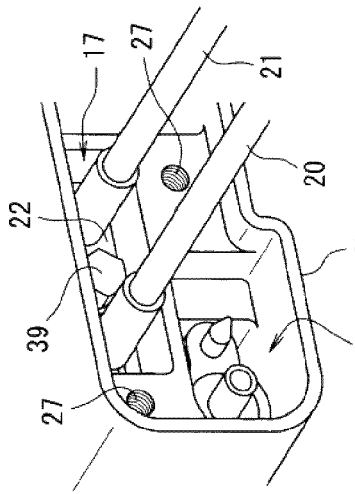
FIG. 9A
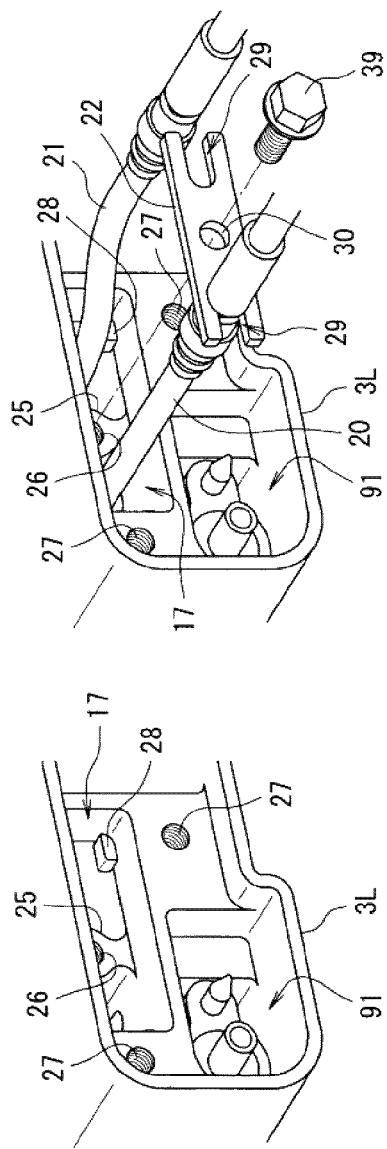
FIG. 9B
FIG. 9C
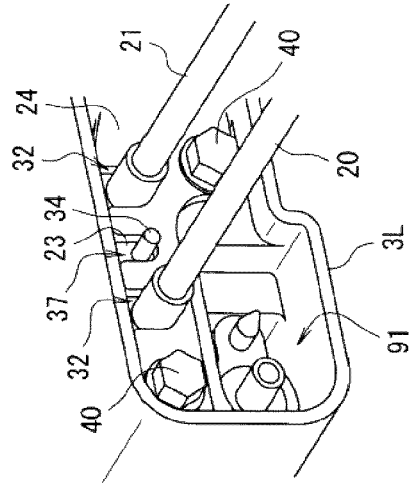
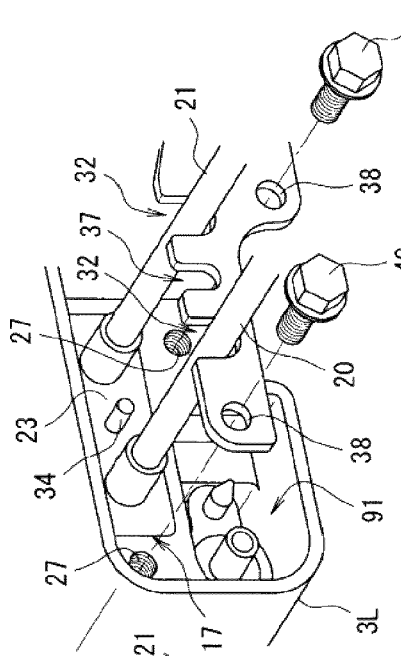
FIG. 9D
FIG. 9E
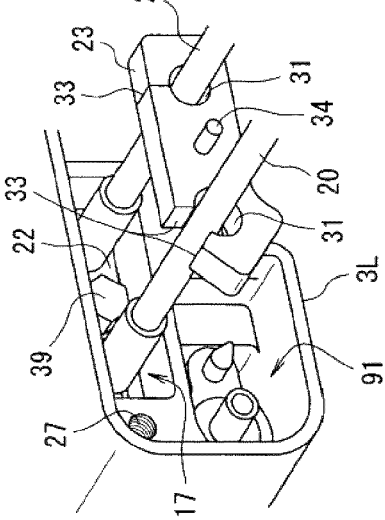
FIG. 9F

COWLING STRUCTURE FOR OUTBOARD MOTOR

BACKGROUND OF THE INVENTION

1. Field of the Invention

The present invention relates to a cowling structure that covers an engine above an outboard motor, and is particularly preferred when a cowling includes a lower cowling and an upper cowling.

2. Description of the Related Art

In general, an outboard motor is provided with an engine in its upper portion and is covered by a cover called a "cowling". The outboard motor is arranged at the stern of a hull while a control compartment is disposed in the front of the hull. Accelerating operation and shift operation in the control compartment is transmitted through a throttle cable and a shift cable to the outboard motor. The outboard motor is usually mounted after the hull is completely manufactured. For this reason, cables must be connected to the inside of the hull from the outside of the cowling of the outboard motor after the outboard motor is completely manufactured. In the conventional technique shown in JP-A-Hei 6-211191, the outside of the cable is covered with a rubber sealing member (grommet), and the sealing member is fitted and fixed to a recess formed by partially removing an upper-cowling joining surface of the lower cowling.

In the conventional cowling structure for an outboard motor, a certain sealing property at the joining surface between the lower cowling and the upper cowling can be secured. However, since the upper-cowling joining surface of the lower cowling is partially removed, a notch is inevitably formed on the upper-cowling joining surface of the lower cowling. For this reason, there is a problem that a complicated sealing structure is necessary in order to prevent water from entering the inside of the cowling via the notch. For example, FIG. 13 is an example of the conventional cowling structure. A portion of an upper-cowling joining surface 11' of a lower cowling 3L, which is a cable insertion portion, is divided, and a divided portion 101' is formed. To the narrow slots 104', 105' formed in the divided portion 101' and the lower cowling 3L, a metal support plate 102' and a rubber sealing member 103' covered on cables 20, 21 are fitted, respectively. The divided portion 101' is placed from above and fixed to the lower cowling 3L together with the support plate 102', the sealing member 103', and the cables 20, 21 by bolts 106'. The conventional cowling structure can prevent water from intruding from the surroundings of the cables 20, 21. However, water can intrude from the notch formed on the upper-cowling joining surface 11'. For this reason, a sealing property of the notch must be secured, additionally. As a result, the sealing structure becomes complicated.

SUMMARY OF THE INVENTION

In view of the above problems, preferred embodiments of the present invention provide a cowling structure for an outboard motor that prevents water intrusion by removing a notch on an upper-cowling joining surface of a lower cowling.

A cowling structure for an outboard motor according to a preferred embodiment of the present invention, which solves the above problems, includes a lower cowling that is provided with a through hole through which an outside cable is connected to the inside of the cowling and that covers a lower portion of an engine; and an upper cowling that is abutted onto the lower cowling through a liquid tight joining surface and that is placed above the lower cowling.

In the cowling structure for an outboard motor, the through hole through which the outside cable is connected to the inside of the cowling is formed in the lower cowling, and the upper cowling is abutted onto the lower cowling through the liquid tight joining surface. Accordingly, an upper-cowling joining surface of the lower cowling is not provided with a notch, and thus water intrusion can be prevented.

The cowling structure for an outboard motor according to a preferred embodiment of the present invention further includes a sealing member that has a generally same outer shape as the through hole and is arranged to hold the cable; a first plate arranged to cover the sealing member; a fastening member that presses and fixes the sealing member through the first plate to the through hole.

In this cowling structure for an outboard motor, the sealing member is pushed into the through hole of the lower cowling in a state that the cable is supported in the sealing member, the first plate is placed on the sealing member, and the sealing member is pressed and fixed to the through hole by the fastening member. Thus, the through hole can be closed in a liquid tight manner.

In the cowling structure for an outboard motor according to a preferred embodiment of the present invention, the fastening member fixes the first plate in an axial direction of the cable.

In this cowling structure for an outboard motor, the first plate is fixed by the fastening member in the axial direction of the cable. Thus, a notch is not provided on the upper-cowling joining surface of the lower cowling.

In the cowling structure for an outboard motor according to a preferred embodiment of the present invention, the sealing member preferably has a size that allows for tight fitting of the sealing member into the through hole, and a lip is provided in a cowling outside portion of a through hole abutting surface of the sealing member.

In the cowling structure for an outboard motor, the sealing member preferably has the size that allows for tight fitting of the sealing member into the through hole, and a lip is formed in the cowling outside portion of the through hole abutting surface of the sealing member. Accordingly, the periphery of the through hole can be tightly closed in a liquid tight manner by simply fitting the sealing member into the through hole, and thus, water intrusion to the inside of the cowling can be prevented securely.

In the cowling structure for an outboard motor according to a preferred embodiment of the present invention, a knob is preferably provided in the cowling outside surface of the sealing member.

This cowling structure for an outboard motor is provided with the knob in the cowling outside surface of the sealing member. Accordingly, the sealing member that is tightly fitted to the through hole can be removed easily, and thus attachment and removal of the cable can be performed easily.

The cowling structure for an outboard motor according to a preferred embodiment of the present invention preferably includes a second plate that supports the cable in the through hole on the cowling, inside of the sealing member.

In this cowling structure for an outboard motor, since the cable is supported by the second plate through the cowling, inside of the through hole, fitting of the sealing member and fixing of the first plate can be performed easily.

In the cowling structure for an outboard motor according to a preferred embodiment of the present invention, when the second plate is fixed to the lower cowling with one fastening member, the inner through hole of the lower cowling is provided with a regulating protrusion that abuts onto the end of the second plate and that regulates the rotation of the second plate.

In this cowling structure for an outboard motor, the inner through hole of the lower cowling is provided with the regulating protrusion that abuts onto the end of the second plate and that regulates the rotation of the second plate. Thus, the second plate and the cable are positioned easily. Also, the second plate and the cable together can be fixed to the lower cowling easily while the cable is supported by the second plate.

The cowling structure for an outboard motor according to a preferred embodiment of the present invention includes the following structural features when the two cables are lined in parallel or substantially in parallel and connected to the inside of the cowling: a cable supporting groove that is formed in the second plate from both sides of a cable lining direction; two insertion holes formed in the sealing member and through which each cable is passed; a split that is provided in the sealing member such that the split is communicated with the insertion hole and the split is formed in the direction that crosses the lining direction of the cable and the axial direction of the cable; a groove that is formed in the first plate from the direction which crosses the lining direction of the cable and the axial direction of the cable and that is placed around the cable.

In this cowling structure for an outboard motor, when the two cables are connected to the inside of the cowling while being lined in parallel or substantially in parallel, the two cables are respectively supported by the cable support grooves of the second plate, and the second plate is fixed to the through hole of the lower cowling. Accordingly, a cable position in the lining direction is determined. When the sealing member covered on the outside of the cable is fitted into the through hole, a position that crosses the lining direction of the cable is determined. In this state, the groove of the first plate is placed around the cable, the first plate is placed onto the sealing member, and the sealing member is fixed to the lower cowling together with the first plate by the fastening member. Thus, these members can easily be fixed to the lower cowling while the cables are positioned.

In this cowling structure for an outboard motor according to a preferred embodiment of the present invention, a hook receiving portion is preferably provided below a joining surface to the upper cowling, and a hook is attached to the outside of the upper cowling.

In this cowling structure for an outboard motor, the hook attached to the outside of the upper cowling is hooked to the hook receiving portion of the lower cowling, and the lower cowling and the upper cowling are fixed accordingly. Thus, the upper-cowling joining surface of the lower cowling does not have to be provided with a notch, and water intrusion can be prevented.

In the cowling structure for an outboard motor according to a preferred embodiment of the present invention, a cover is preferably attached to the outside of the hook.

In this cowling structure for an outboard motor, since the cover is attached to the outside of the hook, it provides an improved, aesthetically pleasing appearance.

In the cowling structure for an outboard motor according to a preferred embodiment of the present invention, the through hole that connects the outside cable to the inside of the cowling is preferably provided in the lower cowling, and the upper cowling abuts onto the lower cowling through the liquid tight joining surface. Accordingly, a notch is not provided on the upper-cowling joining surface of the lower cowling, and water intrusion can be reliably prevented.

Other features, elements, arrangements, steps, characteristics and advantages of the present invention will become more apparent from the following detailed description of preferred embodiments of the present invention with reference to the attached drawings.

BRIEF DESCRIPTION OF THE DRAWINGS

FIGS. 7A and 7B show a cable connection structure of the cowling in FIG. 3, in which FIG. 7A is a front view, and FIG. 7B is a cross-sectional view taken along the line A-A in FIG. 7A.

FIGS. 9A-9F are explanatory views of assembling of the cable connection structure in FIG. 7.

DETAILED DESCRIPTION OF THE PREFERRED EMBODIMENTS

Preferred embodiments of a cowling structure for an outboard motor according to the present invention will hereinafter be described with reference to the drawings.

Figure 1:
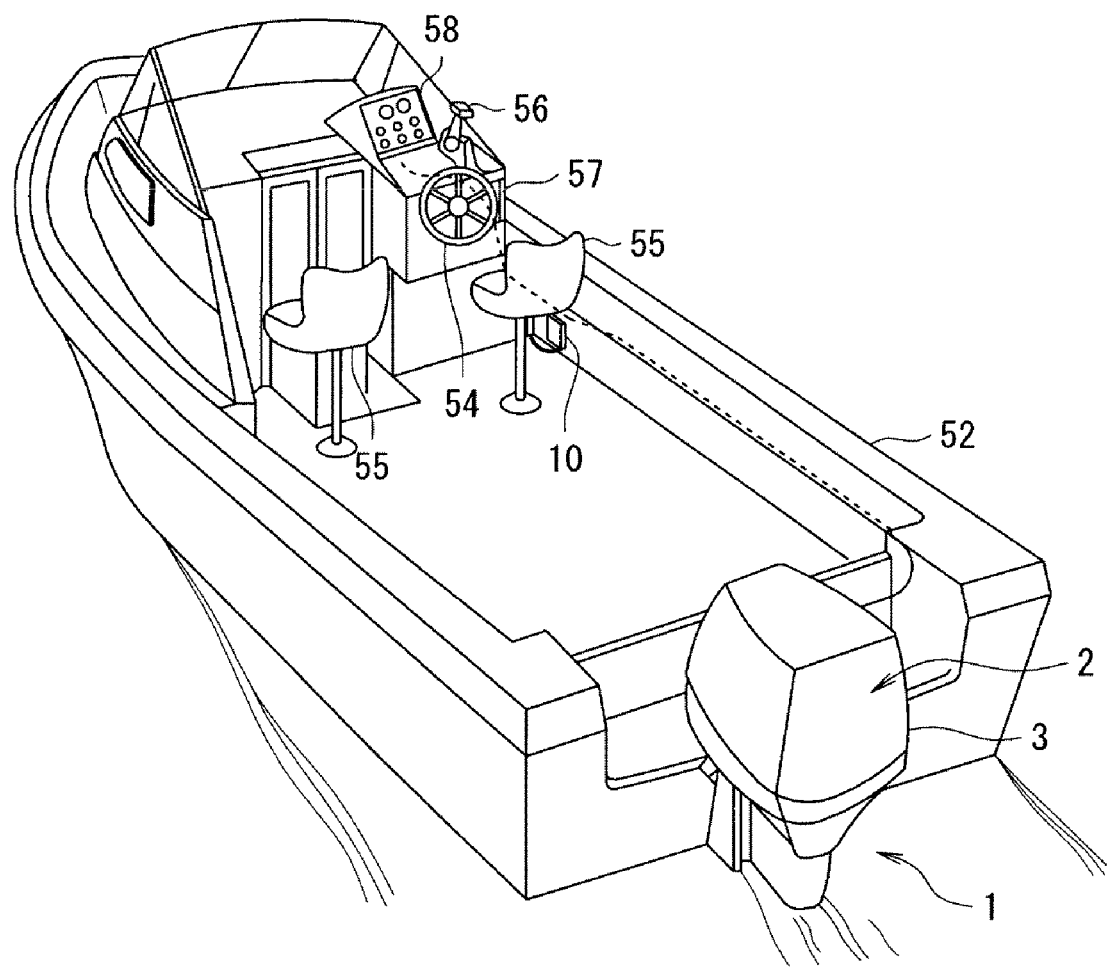
FIG. 1 is a schematic view of a preferred embodiment of a watercraft in which a control unit for an outboard motor is installed.

FIG. 1 is a schematic view showing configuration of a watercraft to which a cowling structure for an outboard motor in a preferred embodiment is mounted. This watercraft has an outboard motor 1 that is mounted to the stern of an open-deck hull 52 and, at its front, includes a control compartment in which a steering wheel 54, seats 55, a remote control lever 56, a switch panel 57 that includes a main switch and a start switch, a meter panel 58, and the like are disposed. The outboard motor 1 includes therein an engine control unit to control an engine disposed in a cowling, which will be described later. Also, a remote control unit that is used to control the outboard motor 1 remotely is disposed in the switch panel 57, and the remote control unit is connected to the engine control unit by a cable. In addition, an immobilizer receiver 10 that receives an authentication code from a so-called transponder (transmitter or repeater) is mounted on a vertical or nearly vertical surface below the control compartment, which is a sidewall of a hull 52, and is connected to the remote control unit in the switch panel 57 by a cable.

Figure 2:
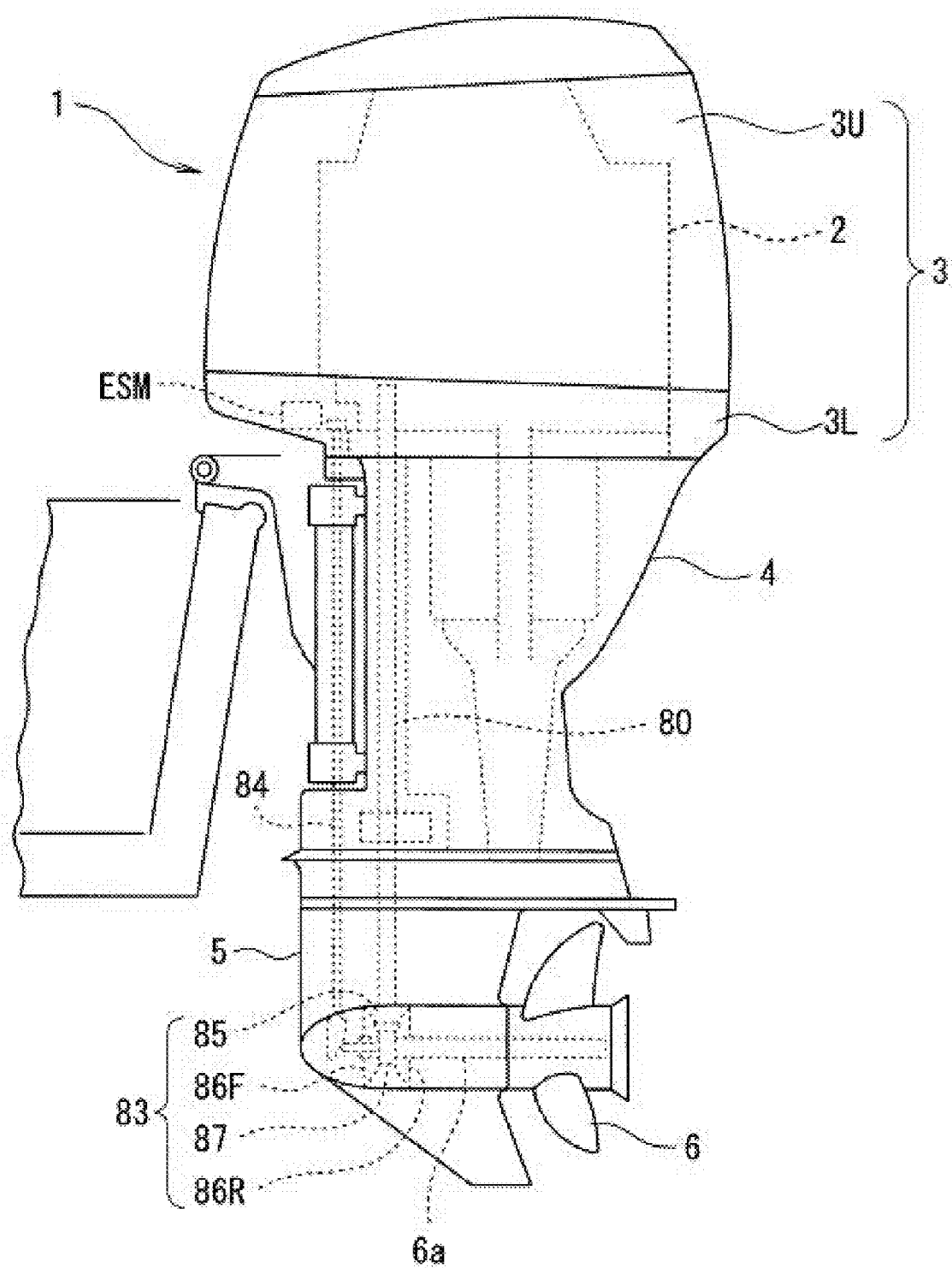
FIG. 2 is an external view of the outboard motor used in the watercraft in FIG. 1.

As shown in FIG. 2, the outboard motor 1 preferably includes a cowling 3, an upper case 4, and a lower case 5. The outboard motor 1 is mounted to the hull 52 by a clamp (not shown) for vertical and transverse pivotal movement relative to the hull 52. The cowling 3 preferably includes an upper cowling 3U and a lower cowling 3L and includes therein an engine 2.

A propeller shaft 6a as a rotary shaft of a propeller 6 is inserted in the lower case 5 in a horizontal direction. A drive shaft 80 that extends from the inside of the cowling 3 to the inside of the lower case 5 is connected at its lower end to the propeller shaft 6a via a shift change mechanism 83 that is constituted with a driver gear 85 including bevel gears, a forward gear 86F, a reverse gear 86R, and a dog clutch 87. Then, a shift rod 84 that is vertically disposed in parallel with the drive shaft 80 is rotated by an electrical rotary mechanism ESM that includes an electric motor controlled by an electrical controlled unit (not shown). Consequently, the shift change mechanism 83 is actuated to make a shift change to neutral, forward, or reverse, and the rotary force of the drive shaft 80 is subsequently transmitted to the propeller shaft 6a.

In other words, in the shift change mechanism 83, the forward gear 86F and the reverse gear 86R, both of which are rotatably disposed on the propeller shaft 6a, are engaged with the drive gear 85 that is fixed to the lower end of the drive shaft 80. The dog clutch 87, which is disposed on the propeller shaft 6a to be slidable but not rotatable relative thereto, is disposed between the forward gear 86F and the reverse gear 86R. In addition, the dog clutch 87 is slid on the propeller shaft 6a in conjunction with the rotation of the shift rod 84 (rotation of a cam surface at the lower end of the shift rod).

In the shift change mechanism 83 as described above, the shift rod 84 is rotated about its axis by the electrical rotary mechanism ESM, thereby moving the dog clutch 87 either for engagement with one of the forward gear 86F and the reverse gear 86R to transmit the rotation of the drive shaft 80 to the propeller shaft 6a via the respective gear, or to an intermediate position between the forward gear 86F and the reverse gear 86R to prevent engagement with any of the gears so that the outboard motor 1 is brought into a neutral state where the rotation of the drive shaft 80 is not transmitted to the drive shaft 6a.

A battery on the hull 52 is connected to the outboard motor 1 via a battery switch (not shown) and a battery cable (not shown), and power from the battery is supplied to electrical components and the engine control unit of the outboard motor 1. In addition, the outboard motor 1 is connected to the hull 52 by a remote control cable and a throttle shift cable. In this preferred embodiment, the engine control unit for the outboard motor 1 is installed in the outboard motor 1 and connected to the remote control unit in the switch panel 57 by the remote control cable. As described above, the remote control unit in the switch panel 57 is connected to the immobilizer receiver 10. Therefore, various changes can be made in the specification after code authentication by transmitting the authentication result of the authentication code, which is produced by the immobilizer receiver 10, to the engine control unit. In this preferred embodiment, the activation of the engine 2 in the outboard motor 1 is permitted when the authentication code is authenticated by the immobilizer receiver 10. In addition, the engine 2 is activated only when the switch panel 57 outputs an engine activation command after the authentication of the code. The specification after the authentication of the code is not limited to the above, and may include use of the battery switch or cancellation of a shift lock of the shift change mechanism.

Figure 3:
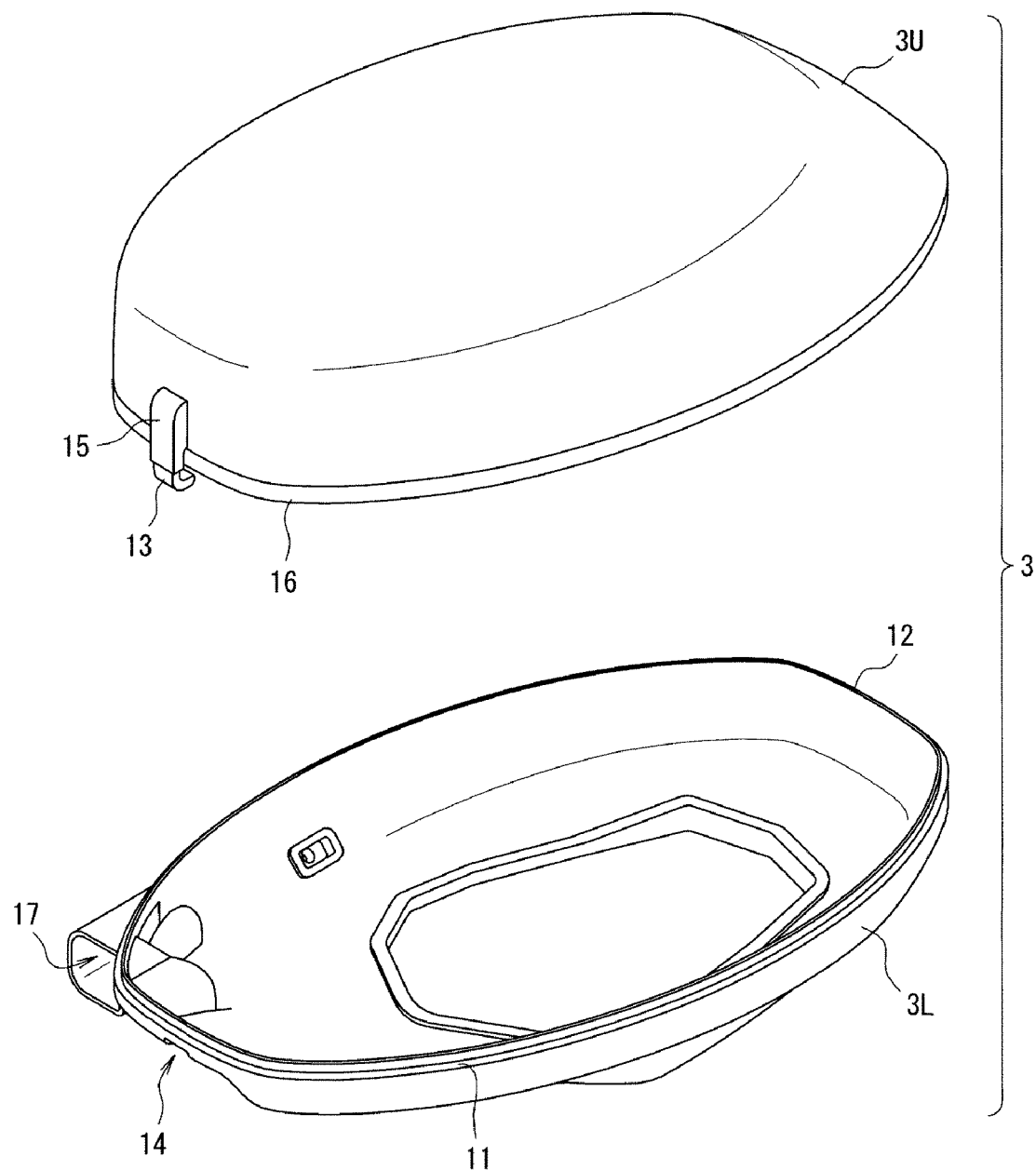
FIG. 3 is a perspective view of a cowling of the outboard motor in FIG. 2.

FIG. 3 shows a perspective view of the upper cowling 3U and the lower cowling 3L. The reference numeral 11 in the drawing denotes the upper-cowling joining surface of the lower cowling 3L. The lower cowling 3L does not have a notch on its upper edge. The sealing member 16 that is covered on an entire lower edge of the upper cowling 3U is interposed between the upper cowling 3U and the lower cowling 3L. The sealing property or liquid tight property between the upper cowling 3U and the lower cowling 3L is secured by the sealing member 16 extending on the entire edge and by the upper-cowling joining surface without a notch. A support edge 12 that supports a lower edge of the upper cowling 3U from inside is disposed on the inside of the upper-cowling joining surface 11.

Figure 4:
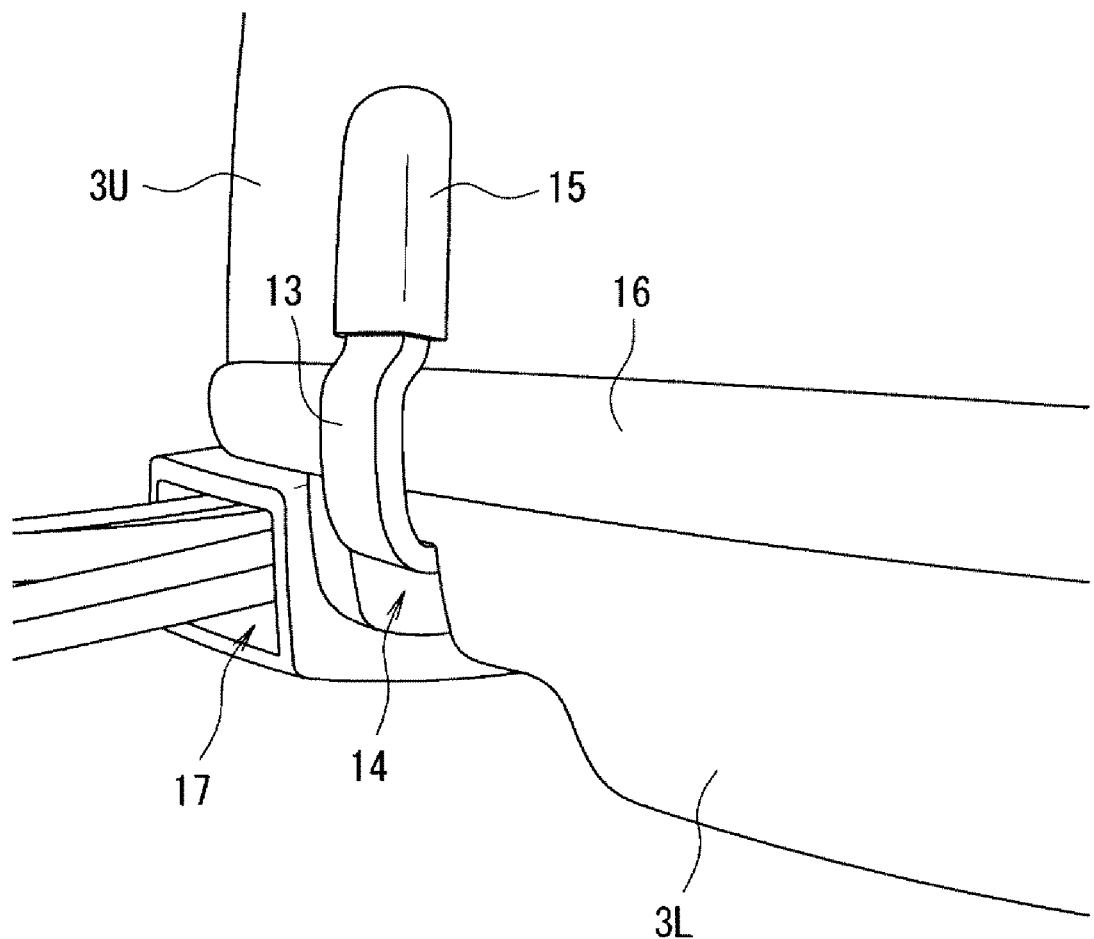
FIG. 4 is a perspective view of an upper cowling hook structure of the cowling in FIG. 3.
Figure 5:
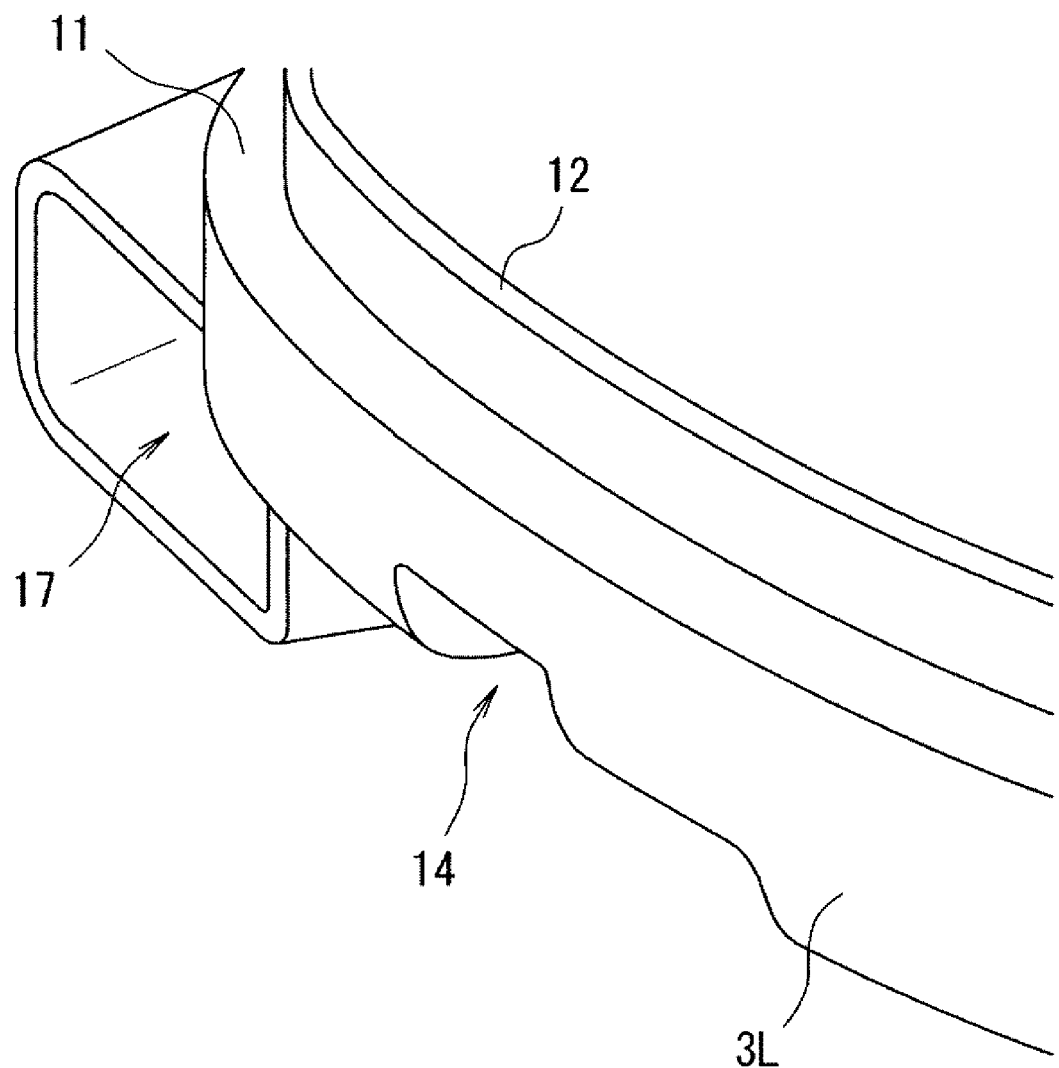
FIG. 5 is a perspective view of the hook receiving portion of a hook structure in FIG. 4.
Figure 6:
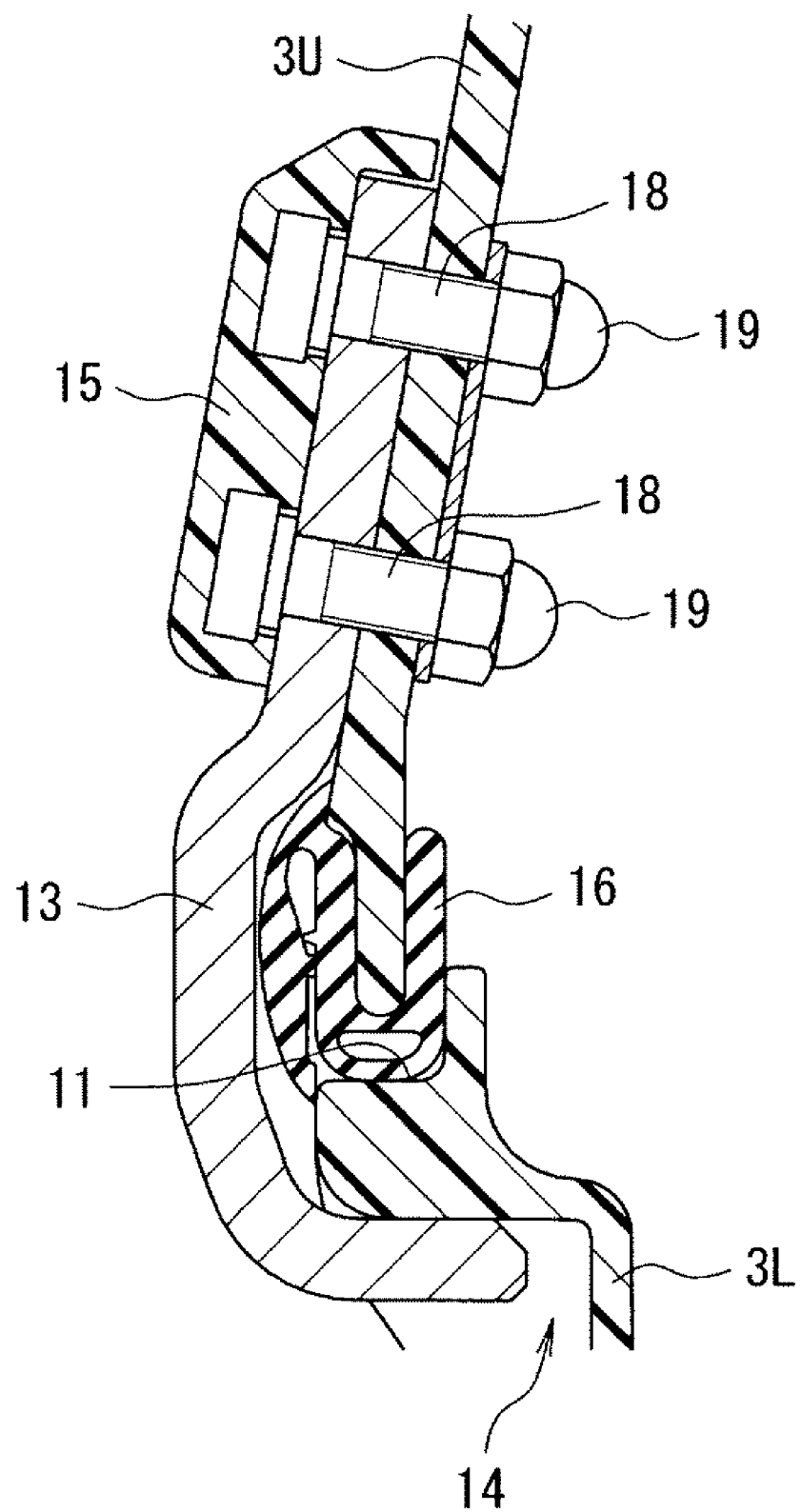
FIG. 6 is a cross-sectional view of a hook of the hook structure in FIG. 4.

In order to secure the sealing property, a hook structure that fixes the upper cowling 3U to the lower cowling 3L in the front of the cowling is provided. In the hook structure, as shown in FIG. 4, the upper cowling 3U is fixed to the lower cowling 3L in the manner that a hook 13 attached to the outside of the front of the upper cowling 3U is hooked to a hook receiving portion 14 formed in the lower cowling 3L. FIG. 5 shows the detail of the hook receiving portion 14 formed in the lower cowling 3L. FIG. 6 is the detail of the hook 13 attached to the upper cowling 3U. The reference numeral 17 in the drawing denotes a through hole for cable connection described later.

The hook receiving portion 14 preferably includes a recess that is formed by partially denting the lower cowling 3L in the front of the lower cowling 3L and below the upper-cowling joining surface. The hook 13 is attached in the front of the upper cowling 3U and above the hook receiving portion 14. The outside of the hook 13 is covered with the cover 15 that is decorated with design. A stud bolt 18 is attached to the cover 15. The stud bolt 18 is inserted through the hook 13 and the upper cowling 3U, and screwed and tightened with a cap nut 19. Accordingly, the hook 13 is fixed to the upper cowling 3U. As clearly shown in FIG. 5, since the hook receiving portion 14 is formed below the upper-cowling joining surface of the lower cowling 3L, the upper-cowling joining surface 11 is not provided with a notch. In addition, as shown in FIG. 6, since the hook 13 is attached to the outside of the upper cowling 3U, a gap is not provided between the sealing member 16 and the upper-cowling joining surface 11. Thus, the sealing property or liquid tight property between the upper cowling 3U and the lower cowling 3L is secured.

Figure 10:
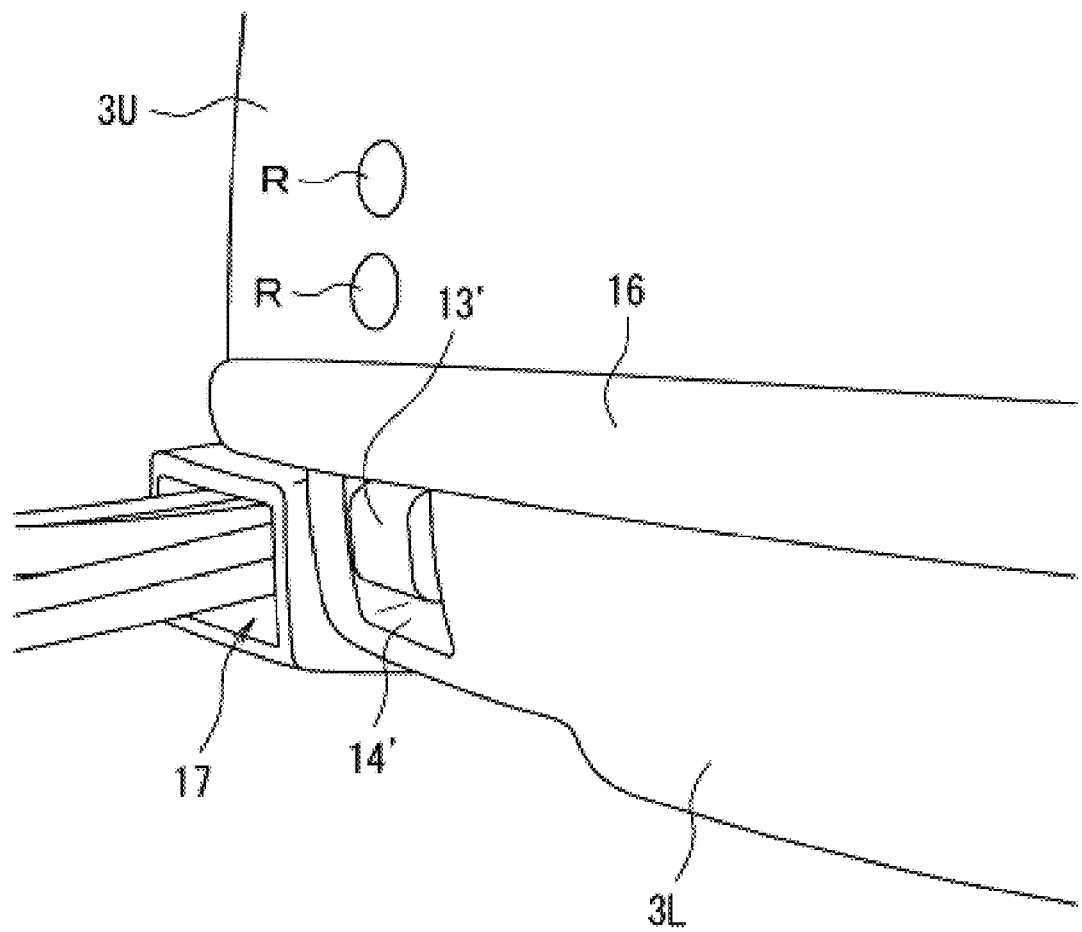
FIG. 10 is a perspective view of an upper cowling hook structure of a conventional cowling.
Figure 11:
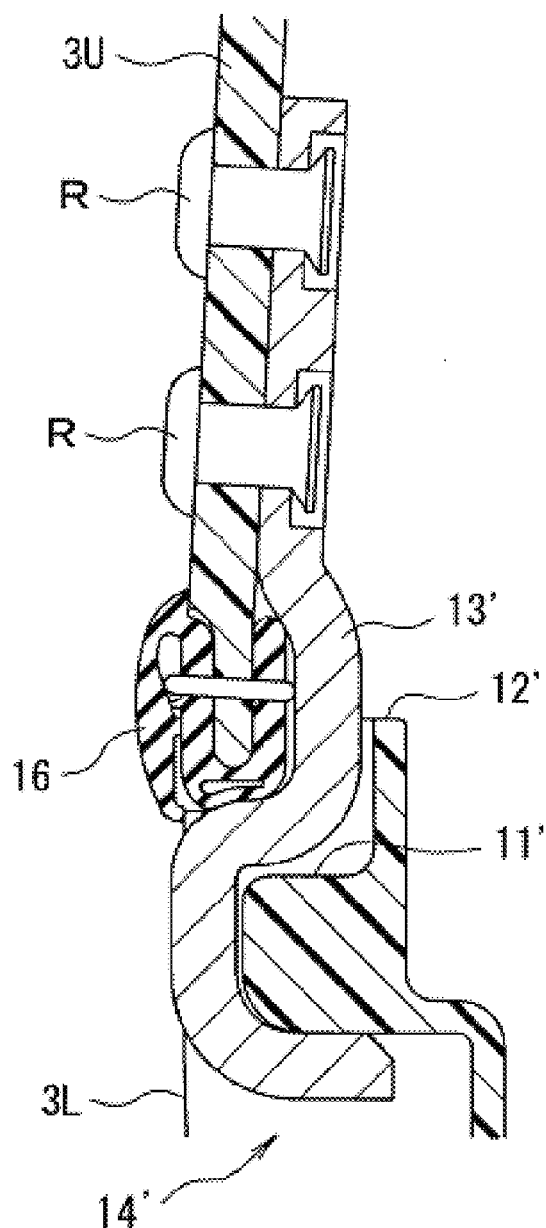
FIG. 11 is a cross-sectional view of a hook of the hook structure in FIG. 10.
Figure 12:
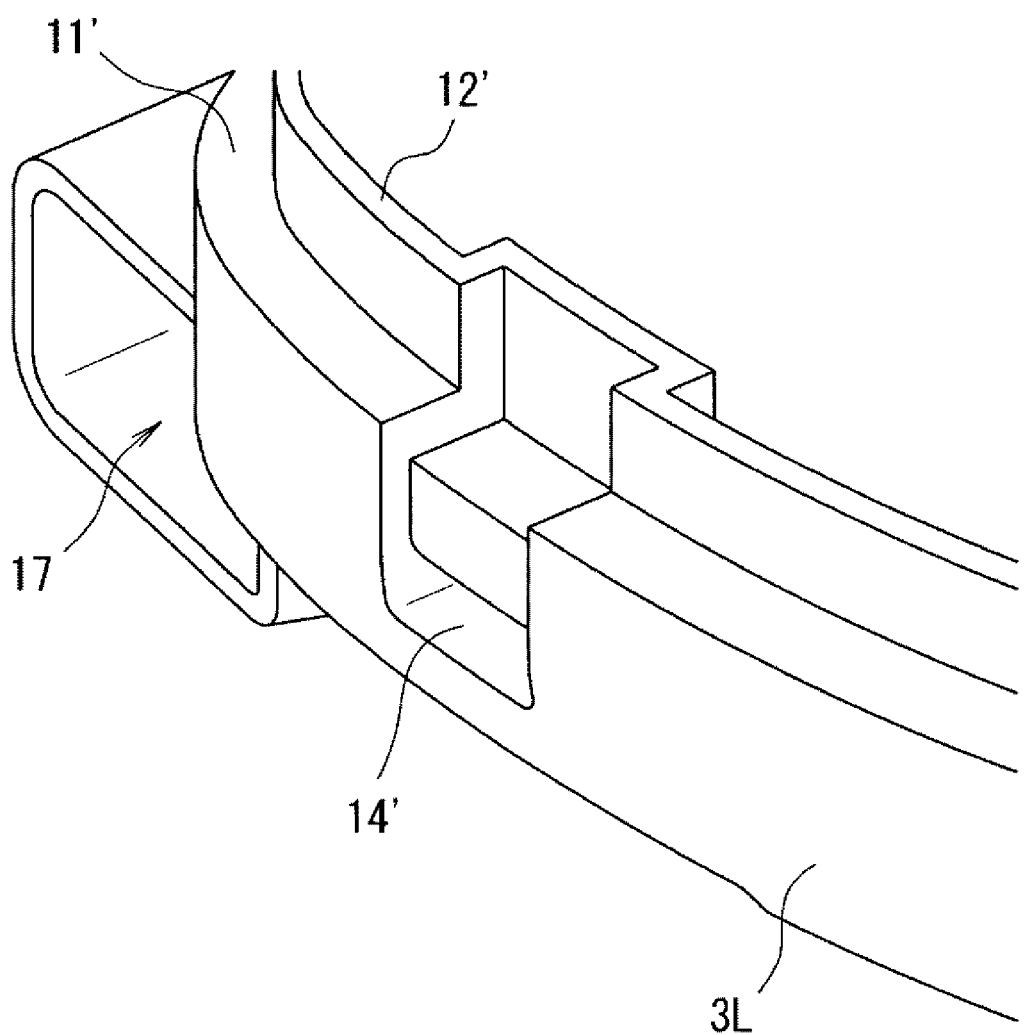
FIG. 12 is a perspective view of a hook receiving portion of the hook structure in FIG. 10.

FIG. 10 shows a conventional structure of an upper cowling hook. For simple explanation, the same reference numerals are used for the same components as in the present preferred embodiment. As shown in FIG. 11, a hook 13' is attached to the inside of the upper cowling 3U, and a lower end of the hook 13' is bent toward the outside of the lower cowling 3L. Incidentally, the hook 13' is fixed to the upper cowling 3U with a rivet R. FIG. 12 shows the hook receiving portion 14' of this hook structure. In the conventional hook structure, since a lower end portion of the hook 13' must be passed inside the sealing member 16 to reach the hook receiving portion 14', the lower cowling 3L is recessed above the hook receiving portion 14' and a portion of the upper-cowling joining surface 11' is provided with a notch. A portion of an upper cowling supporting edge 12' is also recessed.

In the conventional upper cowling hook structure, as described above, since a portion of the upper-cowling joining surface 11' is provided with a notch and a portion of the upper cowling supporting edge 12' is recessed, a gap is produced between the hook 13' and the upper-cowling joining surface 11' and also between the hook 13' and the upper cowling supporting edge 12', and water intrudes from the gaps to the inside of the cowling. On the contrary, in the upper cowling hook structure of the present preferred embodiment, the upper-cowling joining surface 11 does not have a notch. Thus, sealing property or liquid tight property between the upper cowling 3U and the lower cowling 3L can be secured by the upper-cowling joining surface 11 and the sealing member 16.

Figure 7A:
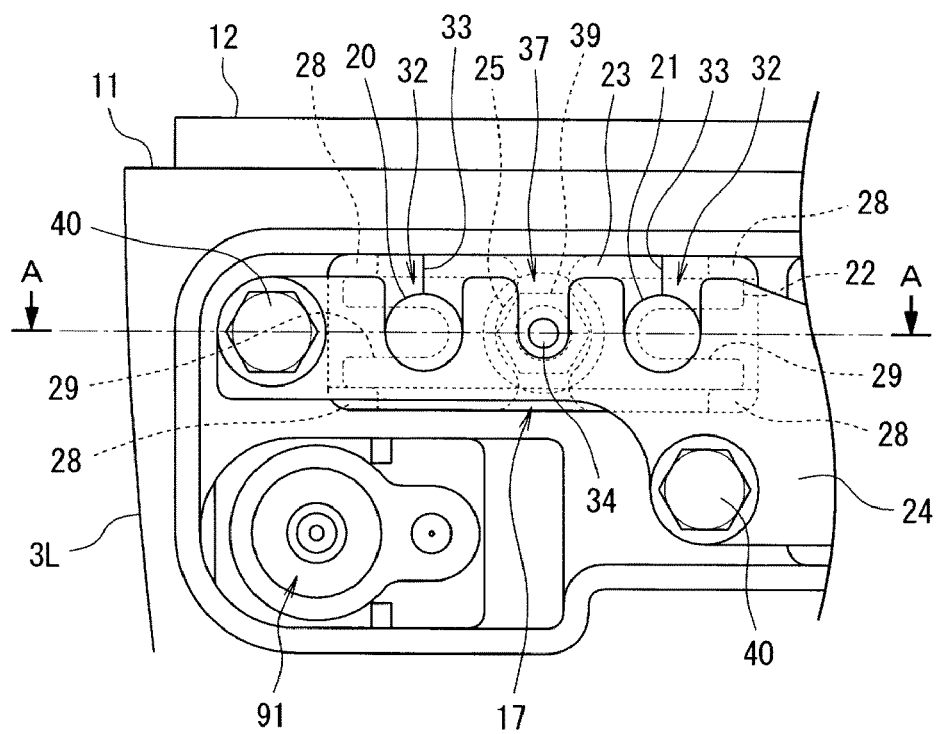
Figure 7B:
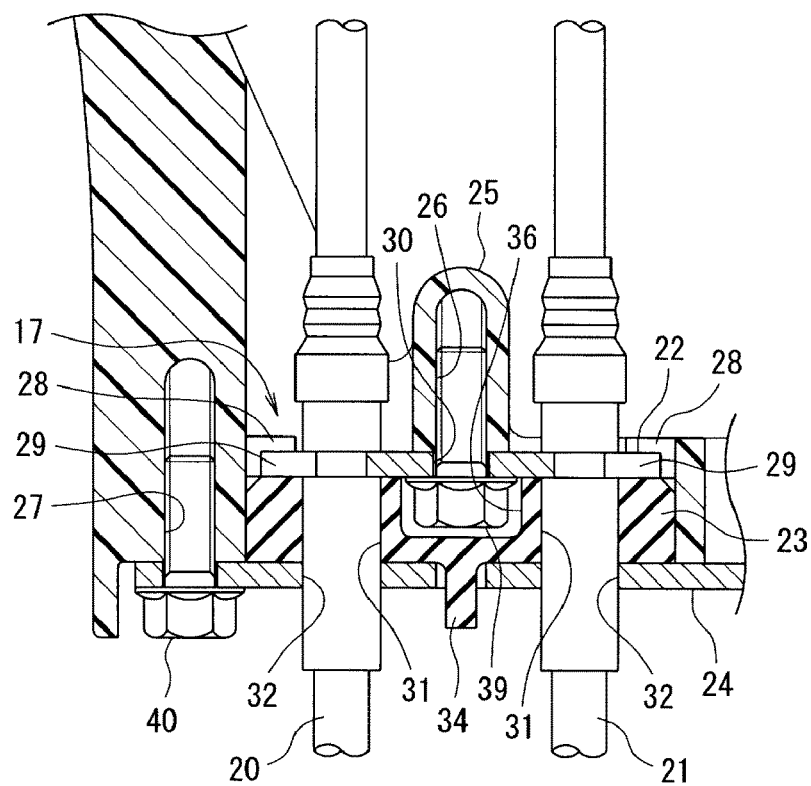

In the present preferred embodiment, the two control cables, which are the shift cable 20 and the throttle cable 21, are connected to the inside of the cowling 3 through the through hole 17 of the lower cowling 3L described above, in order to secure the sealing property or the liquid tight property between the upper cowling 3U and the lower cowling 3L. FIGS. 7A and 7B show a cable insertion portion in a constructed state. A fuel supply port is indicated by the reference numeral 91 in the drawing, and is connected to a fuel tank through an individual connecting member and a fuel pipe (not shown). The cable insertion structure according to a preferred embodiment of the present preferred embodiment includes: a back side plate (second plate) 22 made of a metal plate material, on the back of the through hole; a sealing member 23 made of rubber; a front side plate (first plate) 24 made of metal; and a bolt as a tightening member. The through hole 17 preferably is in the shape of a square, which is removed from a mold, and its four corners are provided with a regulating protrusion 28 that regulates the rotation of the back side plate 22 described later. A bolt receiving portion 25 is arranged in the center at the back when the through hole 17 is seen from the cowling outside. One bolt hole 26 is formed in the center of the bolt receiving part 25. A front side wall when the through hole 17 is seen from the cowling outside is provided with two bolt holes 27.

Figure 8A:
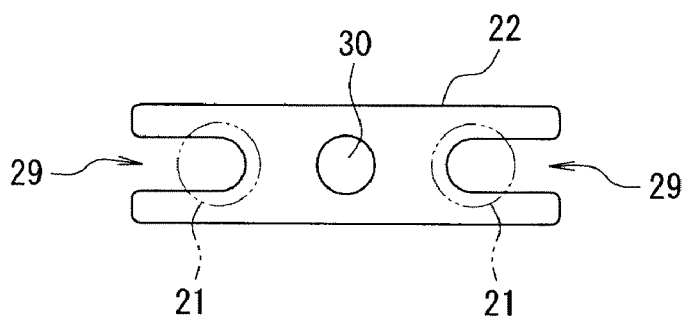
FIGS. 8A-8D are explanatory views of the components of the cable connection structure in FIG. 7.
Figure 8B:
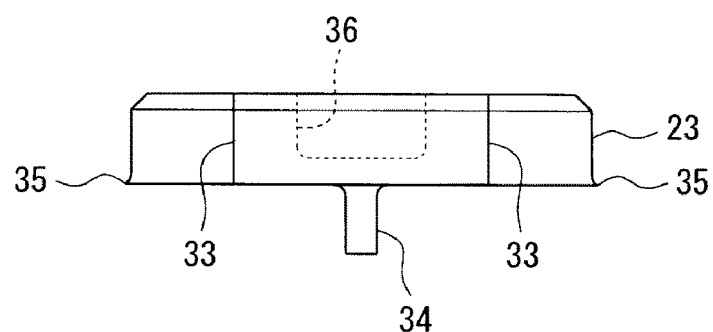
Figure 8C:
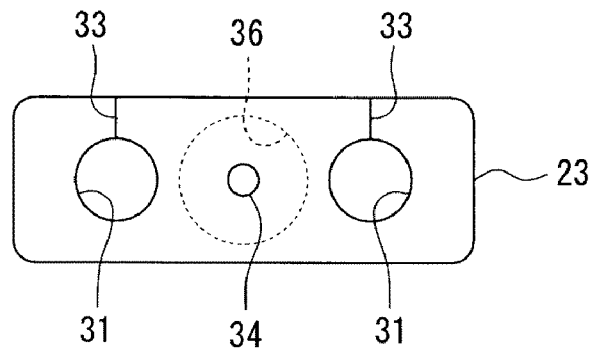
Figure 8D:
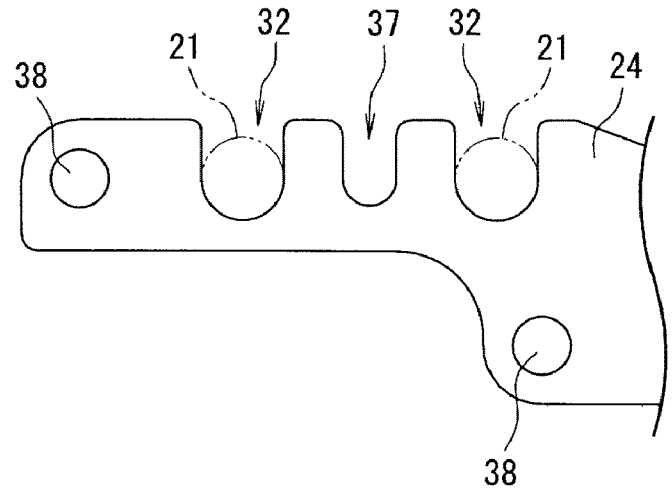

FIG. 8A is a front view of the back side plate 22. FIG. 8B is a plan view of the sealing member 23. FIG. 8C is a front view of the sealing member 23. FIG. 8D is a front view of the front side plate 24. The back side plate 22 is a substantially rectangular metal plate member. The longer side of the back side plate 22 is arranged along the lining direction of the two cables 20, 21. The length of the shorter side is shorter than the height of the through hole 17. The back side plate 22 is provided with cable supporting grooves 29 on both sides in the longitudinal direction of the back side plate 22 or on both outer sides in the lining direction of the cables 20, 21. The back side plate 22 is also provided with a bolt insertion hole 30, through which a bolt described later is inserted, in the center in the longitudinal direction.

The sealing member 23 preferably has a size such that the sealing member 23 is tightly inserted into the through hole 17 in the shape of a square described above. Both ends in the longitudinal direction of the sealing member 23 are provided with a cable insertion hole 31 through which the cables 20, 21 are inserted. A split 33 is formed above the cable insertion hole 31 as shown in FIG. 8C, in other words, in the direction that crosses the lining direction of the two cables 20, 21 and that crosses an axial direction of the cables 20, 21. A cowling outside portion of the outer edge of the sealing member 23 is provided with a thin rubber lip 35 in a protruding manner. The center in the longitudinal direction of the cowling outside surface of the sealing member 23 is provided with a knob 34 that is used for pulling out the sealing member 23. An opposite side of the knob 34 is provided with a storage portion 36 that receives a bolt head.

The front side plate 24 preferably has a size that covers the through hole 17 in the shape of a square described above. The front side plate 24 is provided with a cable groove 32 that is arranged in the same direction as the split 33 of the sealing member 23, which is the direction that crosses the lining direction of the two cables 20, 21 and that crosses the axial direction of the cables 20, 21. The center between the two cable grooves 32 is provided with a knob groove 37 that is placed around the knob 34 of the sealing member 23. The knob groove 37 is open from the same direction as the cable groove 32. A portion of the front plate 24, which is positioned outside of the through hole 17 of the lower cowling 3L, is provided with a bolt insertion hole 38 through which a bolt is inserted to screw to the bolt hole 27.

For example, the cable insertion structure is assembled as follows. In relation to the through hole 17 shown in FIG. 9A, the cables 20, 21 are fitted to the respective cable support grooves 29 of the back side plate 22 as shown in FIG. 9B. The cables 20, 21 are passed through both side spaces of the bolt receiving portion 25 of the through hole 17. The back side plate 22 is inserted into the through hole 17 until it abuts onto the bolt receiving portion 25. When the back side plate 22 is inserted into the through hole 17, the four corners of the back side plate 22 abut onto the regulating protrusions 28 provided on the four corners of the through hole 17, and then rotation of the back side plate 22 is regulated. In this state, the bolt 39 is inserted through the bolt insertion hole 30 and is screwed and tightened to the bolt hole 26, and the back side plate 22 is fixed to the lower cowling 3L as shown in FIG. 9C. Accordingly, a lateral position or a lining position of the cables 20, 21 is determined.

As shown in FIG. 9D, the two splits 33 of the sealing member 23 are opened and fitted onto the cables 20, 21, so that the cables 20, 21 are inserted into the cable insertion hole 31. In this state, as shown in FIG. 9E, the sealing member 23 is pushed into the through hole 17 in the way that the knob 34 directs outside the cowling. The sealing member 23 preferably has a size that allows tight fitting into the through hole 17, and also provided with the lip 35 on a cowling outside portion. Thus, the through hole 17 is tightly closed with the sealing member 23 in a liquid tight manner. At the same time, vertical positions of the cables 20, 21 or positions there of in the direction that crosses the lining direction of the cables 20, 21 is determined.

Lastly, as shown in FIG. 9E, the grooves 32 of the front side plate 24 are placed around the two cables 20, 21, and then the front side plate 24 is abutted onto the front side wall of the through hole 17. Thus, the front side plate 24 is set onto the sealing member 23. In this state, the bolt 40 is inserted through the two bolt insertion hole 38, and screwed into the bolt hole 27 for tightening. As shown in FIG. 9F, the sealing member 23 is fixed to the lower cowling 3L together with the front side plate 24. Accordingly, the cables 20, 21 are fixed, and the through hole 17 is tightly closed in a liquid tight manner by the sealing member 23 and the like. At least, water intrusion from the through hole 17 can be prevented. As described above, the upper-cowling joining surface 11 is not provided with a notch, sealing property or liquid tight property between the upper cowling 3U and the lower cowling 3L is secured by the upper-cowling joining surface 11 and the sealing member 16.

Figure 13:
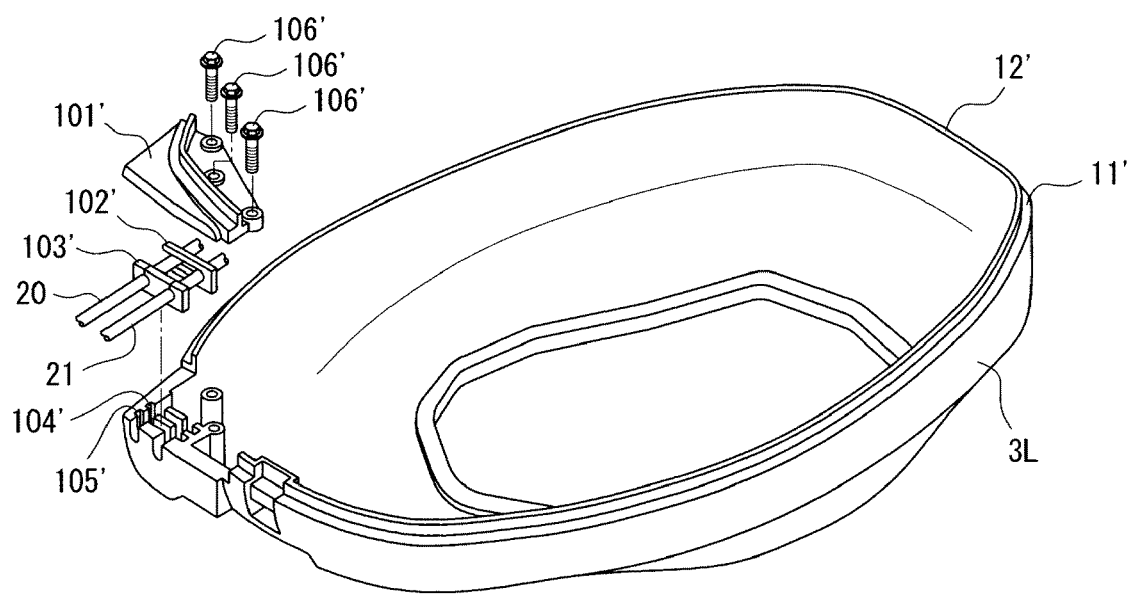
FIG. 13 is an explanatory view of assembling of a conventional cable connection structure.

As described above, since the conventional cable insertion structure shown in FIG. 13 is provided with a notch on the upper-cowling joining surface 11' because of the divided part 101', water intrudes into the cowling. On the contrary, since the cable insertion structure of the present invention is not provided with a notch on the upper-cowling joining surface 11, water intrusion into the cowling can be prevented.

According to the cowling structure for an outboard motor in the present preferred embodiment, the through hole 17 that connects the outside cables 20, 21 to the cowling inside is preferably formed in the lower cowling 3L, and the upper cowling 3U is abutted onto the lower cowling 3L through the liquid tight upper-cowling joining surface 11. Thus, the upper-cowling joining surface 11 of the lower cowling 3L is not provided with a notch, and water intrusion can be prevented.

In the present preferred embodiment, the cables 20, 21 are preferably supported by the sealing member 23 that has the same outer shape as the through hole 17. In that state, the sealing member 23 is pushed into the through hole of the lower cowling. The front side plate (first plate) 24 is set onto the sealing member 23. In that state, the sealing member 23 is pressed and fixed to the through hole 17 by the bolt (fastening member) 40. Thus, the through hole 17 can be closed in a liquid tight manner.

Also, since the front side plate (first plate) 24 is fixed by the bolt (fastening member) 40 in the axial direction of the cables 20, 21, a notch need not be disposed on the upper-cowling joining surface 11 of the lower cowling 3L.

The sealing member 23 preferably has a size that allows tight fitting of the sealing member 23 into the through hole 17, and the lip 35 is formed in the cowling outside portion of the sealing member 23. Thus, the periphery of the through hole 17 can be closed tightly by simply fitting the sealing member 23 into the through hole 17, and water intrusion into the cowling can be securely prevented.

The cowling outside surface of the sealing member 23 is provided with the knob 34. Thus, the sealing member 23 that is tightly fitted into the through hole 17 can be removed easily, and that makes it easy to attach or remove the cables 20, 21.

Also, since the cables 20, 21 are supported with the back side plate (second plate) 22 at the cowling inside of the through hole 17, fitting of the sealing member 23 and fixing of the front side plate (first plate) 24 can be performed easily.

Also, the regulating protrusion 28 that abuts onto an end portion of the back side plate (second plate) 22 and that regulates the rotation of the back side plate 22 is provided in the through hole 17 of the lower cowling 3L. Thus, the back side plate (second plate) 22 and the cables 20, 21 are easily positioned, and the cables 20, 21 are easily supported with the back side plate (second plate) 22 and fixed to the lower cowling 3L.

In the present preferred embodiment, connection of the two cables 20, 21 arranged in parallel or substantially in parallel to the inside of the cowling is preferably performed in the following manner. The two cables 20, 21 are supported with the cable supporting groove 29 of the back side plate (second plate) 22, and the back side plate (second plate) 22 is fixed to the through hole 17 of the lower cowling 3L, so that the lining positions of the cables 20, 21 are determined. The sealing member 23 that is placed on the outside of the cables 20, 21 is fitted into the through hole 17, so that the position that crosses the lining direction of the cables 20, 21 is determined. In this state, the groove 32 of the front side plate (first plate) 24 is placed around the cables 20, 21, and the front side plate (first plate) 24 is set onto the sealing member 23, and then the sealing member 23 is fixed to the lower cowling 3L together with the front side plate (first plate) 24 by the bolt (fastening member) 40. Thus, the cables 20, 21 can be easily fixed to the lower cowling 3L while establishing the position.

Also, in the present preferred embodiment, the hook 13 attached to the outside of the upper cowling 3U is hooked to the hook receiving portion 14 of the lower cowling 3L in order to fix the upper cowling 3U to the lower cowling 3L. Thus, since the upper-cowling joining surface 11 of the lower cowling 3L is not provided with a notch, water intrusion can be prevented.

Also, since the cover 15 is attached to the outside of the hook 13, it provides an improved, aesthetically pleasing appearance.

An outboard motor to which the cowling structure for an outboard motor according to the present invention is applied is not limited to the one described in the above preferred embodiments. Similarly, a watercraft to which the cowling structure for an outboard motor according to the present invention is applied is not limited to the one described in the above preferred embodiments.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A cowling structure for an outboard motor, the cowling structure comprising:
    a lower cowling including a through hole through which an outside cable is connected to an interior of a cowling, the lower cowling including an upper joining surface;
    an upper cowling including a lower joining surface that abuts the upper joining surface of the lower cowling to have a liquid tight property therebetween, the upper cowling located above the lower cowling;
    a sealing member having a generally same outer shape as the through hole to hold the cable, a first plate that covers the sealing member, and a fastening member in the first plate to press and fix the sealing member to the through hole; and
    a second plate that supports the cable in the through hole in a cowling interior surface of the sealing member.

2. The cowling structure for an outboard motor according to claim 1, wherein the fastening member fixes the first plate in an axial direction of the cable.

3. The cowling structure for an outboard motor according to claim 1, wherein the sealing member has a size that results in the sealing member being tightly fit into the through hole, and a lip is provided on a cowling outside portion of a through hole abutting surface of the sealing member.

4. The cowling structure for an outboard motor according to claim 1, wherein a knob is provided on a cowling exterior surface of the sealing member.

5. The cowling structure for an outboard motor according to claim 1, wherein when the second plate is fixed to the lower cowling with one fastening member, an inside of the through hole of the lower cowling is provided with a regulating protrusion that abuts onto an end of the second plate and to regulate rotation of the second plate.

6. The cowling structure for an outboard motor according to claim 1, wherein two cables are aligned substantially parallel and connected to an inside of the cowling, the cowling structure further comprises:
    a cable supporting groove in the second plate from both sides of a cable alignment direction; two insertion holes in the sealing member and through which each of the cables pass; a split in the sealing member such that the split communicates with the insertion hole and the split extends in a direction that crosses the cable alignment direction and the axial direction of the cables; and a groove in the first plate in a direction which crosses the cable alignment direction and the axial direction of the cables and that is placed around the cables.

7. The cowling structure for an outboard motor according to claim 1, wherein a hook receiving portion is provided in the lower cowling below the upper joining surface of the lower cowling, and a hook is attached to an outside of the upper cowling.

8. The cowling structure for an outboard motor according to claim 7, wherein a cover is attached to an outside of the hook.

* * * * *